(12) United States Patent
Hoogstrate et al.

(10) Patent No.: US 10,054,149 B2
(45) Date of Patent: Aug. 21, 2018

(54) DUAL SLIDING WEDGE T-NUT

(71) Applicant: JONIX LLC, Harrisville, NH (US)

(72) Inventors: John R. Hoogstrate, Harrisville, NH (US); Nicholas Paige, Springfield, VT (US)

(73) Assignee: Jonix LLC, Harrisville, NH (US)

(*) Notice: Subject to any disclaimer, the term of this patent is extended or adjusted under 35 U.S.C. 154(b) by 482 days.

(21) Appl. No.: 14/962,755

(22) Filed: Dec. 8, 2015

(65) Prior Publication Data

US 2017/0159697 A1    Jun. 8, 2017

(51) Int. Cl.
| | |
|---|---|
| *B25B 1/00* | (2006.01) |
| *F16B 37/04* | (2006.01) |
| *B23Q 1/42* | (2006.01) |
| *B23Q 3/10* | (2006.01) |
| *B23Q 1/28* | (2006.01) |
| *F16B 2/14* | (2006.01) |

(52) U.S. Cl.
CPC .............. *F16B 37/045* (2013.01); *B23Q 1/28* (2013.01); *B23Q 1/42* (2013.01); *B23Q 3/102* (2013.01); *F16B 2/14* (2013.01)

(58) Field of Classification Search
CPC .... B25B 1/00; B25B 3/00; B25B 5/00; B25B 5/02; B25B 5/06
See application file for complete search history.

(56) References Cited

U.S. PATENT DOCUMENTS

| | | | |
|---|---|---|---|
| 4,208,045 A | 6/1980 | Rowe et al. | |
| 4,630,944 A | 12/1986 | Moehr | |
| 4,804,171 A * | 2/1989 | Dornfeld | B25B 1/08 269/138 |

(Continued)

*Primary Examiner* — Lee D Wilson
(74) *Attorney, Agent, or Firm* — Delio, Peterson and Curcio, LLC; David R. Pegnataro

(57) ABSTRACT

A T-Nut for use in a machine tool having a tooling plate with an inverted T-shaped channel. The T-Nut comprises a central body having oppositely inclined faces each including an opening forming a cavity extending through the central body, and first and second wedges in slideable communication with the central body inclined faces. Each of the wedges have wings extending laterally beyond the central body to engage upper surfaces of the channel lower wide portion and include a clearance hole extending through a length of the wedge. A rotatable actuation member abuts the first wedge at an end opposite the first wedge mating surface and is internally threaded for a distance from one end thereof. An externally threaded cylindrical shaft is engaged with the internal threads of the actuation member and extends through the first and second wedge clearance holes, the shaft being secured to and non-rotatable with the second wedge. In operation, when tooling is secured to the top surface of the central body and the actuation member is rotated, the first and second wedges are slideably moved symmetrically along the central body inclined faces until the first and second wedge wings engage upper surfaces of the channel lower wide portion while the tooling is simultaneously urged in the direction of the tooling plate until the tooling mounting surface bears against the tooling plate top surface, thereby removably securing the tooling to the tooling plate.

20 Claims, 3 Drawing Sheets

(56) References Cited

U.S. PATENT DOCUMENTS

| | | | | |
|---|---|---|---|---|
| 5,056,766 A | * | 10/1991 | Engibarov | B25B 1/08 269/101 |
| 5,199,836 A | | 4/1993 | Gogarty | |
| 5,509,644 A | | 4/1996 | Engibarov | |
| 6,126,158 A | * | 10/2000 | Engibarov | B25B 5/08 269/101 |
| 6,126,159 A | * | 10/2000 | Dornfeld | B25B 5/08 269/138 |
| 6,349,929 B1 | | 2/2002 | Speltz et al. | |
| 6,426,133 B1 | | 7/2002 | Kondo et al. | |
| 2003/0081996 A1 | | 5/2003 | Sun et al. | |
| 2015/0336241 A1 | * | 11/2015 | Engibarov | B25B 1/2405 269/281 |
| 2016/0144472 A1 | * | 5/2016 | Merilainen | B25B 1/02 29/559 |
| 2017/0159697 A1 | * | 6/2017 | Hoogstrate | F16B 37/045 |

* cited by examiner

DUAL SLIDING WEDGE T-NUT

BACKGROUND OF THE INVENTION

1. Field of the Invention

The present invention relates to tooling plates having a T-Slot, as used in the machine tool industry and other industries, and more specifically, to an improved T-Nut for engaging with a T-Slot and a method for securing a form of tooling to a tooling plate using the improved T-Nut.

2. Description of Related Art

In the machine tool industry and in other industries, tooling plates that employ T-Slots are used to hold, including but not limited to, tooling, specialty tooling, metrology, and other similar devices, to the tooling plate. As used herein, the term "tooling" will be used to refer generally to devices which are held to a tooling plate, as described above. For many objects that need to be secured to the tooling plate, one method of engaging the T-Slot in the tooling plate is with a bolt that passes through the object and engages a T-Nut placed in the T-Slot of the tooling plate, whereby the bolt is tightened, drawing the T-Nut to bear against the T-Slot geometry and thus clamping the object to the tooling plate (Method 1). This method can only be used when the object being secured to the tooling plate has no internal components that will be interfered with by the clamping bolt passing through the object.

Another known method comprises using an outboard clamping assembly engaged with the T-Slot, similar to Method 1 described above, but instead using a clamping screw to bear down on an external flange at the periphery of the object (Method 2). This method can be used if the object to be clamped to the tooling plate has internal components that do not allow a bolt to pass through, such as a spindle or similar assembly—in which case a mounting foot can be made with a flange and the method can be employed. Method 2 almost always requires an increase in the footprint on which the object sits, thereby limiting the number of objects that can be held on to the tooling plate. One example would be an ultra-precision lathe for the manufacture of contact lenses and intra-ocular lenses.

Normally, the tooling plate is fully populated with stationary cutting tools that are held in tool holders that are held onto the tooling plate using Method 1, as described above. These tool holders sit side-by-side with minimal clearance between them on the tooling plate and carry different tooling for performing different cuts on the work piece. Additionally, metrology (devices for setting the tool height) and a device known as a Fast Tool Servo (FTS) may be attached to the same tooling plate. The FTS is, as described above, a device that cannot be held down on a tooling plate by Method 1 because the internal elements of the FTS would be interfered with by a clamping bolt passing therethrough. The FTS also cannot be held down by Method 2 because of the space constraints on the tooling plate.

Therefore, a need exists for a means to secure objects, such as an FTS, to a tooling plate that does not interfere with the internal components of the object and does not increase the footprint on which the object sits.

SUMMARY OF THE INVENTION

Bearing in mind the problems and deficiencies of the prior art, it is therefore an object of the present invention to provide an improved T-Nut or mounting member for use in a machine tool having a tooling plate with an open channel with at least one perpendicular extension below the tooling plate top surface.

It is another object of the present invention to provide an improved method of securing tooling to a tooling plate that does not interfere with the internal components of the tooling and does not increase the footprint on which the tooling sits.

A further object of the invention is to provide a T-Nut or mounting member which allows for simple securing, repositioning and removal of tooling from a machine tool without the need for bolting of the tooling to the tooling plate.

Still other objects and advantages of the invention will in part be obvious and will in part be apparent from the specification.

The above and other objects, which will be apparent to those skilled in the art, are achieved in the present invention which is directed to a mounting member for use in a machine tool having a tooling plate with a top surface and an open channel with at least one perpendicular extension below the tooling plate top surface. The mounting member comprises a central body having at least one inclined face at a first end and an opening forming a cavity extending through the central body, the central body adapted to slidingly fit in the tooling plate open channel and mate with a mounting surface of tooling to be secured to the tooling plate. The mounting member further comprises a first wedge in slideable communication with the central body inclined face and having a top surface and a mating surface at one end inclined at substantially the same angle as the central body inclined face. The first wedge includes a clearance hole extending through a length of the wedge and at least one wing extending laterally beyond the central body to engage an upper surface of the tooling plate open channel at least one perpendicular extension. An actuation member abuts the first wedge at an end opposite the first wedge mating surface and is internally threaded for a distance from one end thereof, and an externally threaded shaft is engaged with the internal threads of the actuation member and extends through the first wedge clearance hole and through the central body cavity, the shaft being secured to and non-rotatable with the central body. When tooling is secured to a top surface of the central body and the actuation member is rotated, the first wedge is slideably moved along the central body inclined face until the first wedge at least one wing engages an upper surface of the open channel at least one perpendicular extension and the tooling is urged in the direction of the tooling plate until the tooling mounting surface bears against the tooling plate top surface, thereby removably securing the tooling to the tooling plate.

The tooling plate open channel may comprise an inverted T-shaped channel having a lower wide portion and an upper narrow portion, and the first wedge may further comprise a second wing opposite the first wing and extending laterally beyond the central body, the first and second wings positioned to engage upper surfaces of the channel lower wide portion.

In an embodiment, the central body may further comprise a second oppositely inclined face at a second end, and the mounting member may further comprise a second wedge in slideable communication with the central body second inclined face having a top surface and a mating surface at one end inclined at substantially the same angle as the central body second inclined face. The second wedge has at least one wing extending laterally beyond the central body to engage an upper surface of the tooling plate open channel at least one perpendicular extension, and includes a clearance hole extending through a length of the wedge wherein the shaft extends through the second wedge clearance hole, the shaft being secured to and non-rotatable with the second wedge. When tooling is secured to the central body top surface and the actuation member is rotated, the first and second wedges are slideably moved symmetrically along the central body inclined surfaces until the first and second wedge at least one wing engages an upper surface of the open channel at least one perpendicular extension and the tooling is urged in the direction of the tooling plate until the tooling mounting surface bears against the tooling plate top surface, thereby removably securing the tooling to the tooling plate.

The tooling plate open channel may comprise an inverted T-shaped channel having a lower wide portion and an upper narrow portion, and the first and second wedges may further comprise a second wing opposite the first wing and extending laterally beyond the central body, the first and second wings positioned to engage upper surfaces of the channel lower wide portion when the actuation member is rotated.

The second wedge and the shaft may each include a cross-drilled through hole having substantially the same diameter, wherein the through holes are aligned when the shaft extends through the second wedge clearance hole, and the shaft is secured to the second wedge using a resilient fastener extending through the aligned through holes. The actuation member may include an opening with a hexagonal engagement on the opposite end, wherein the hexagonal engagement is adapted for receiving an actuating force applied in a rotational direction about a longitudinal axis of the actuation member.

In one or more embodiments, the central body may include a threaded stud attached to or integral with the central body top surface. The threaded stud is capable of mating with an internally threaded opening in a mounting surface of tooling to be secured to the tooling plate. The tooling to be secured to the tooling plate may be a Fast Tool Servo (FTS) having an internally threaded opening on a bottom mounting face, wherein the central body threaded stud is engaged with the FTS internally threaded opening to secure the FTS to the mounting member. The central body may further have a bottom surface including at least one opening having a predetermined depth.

When the central body is slidingly fit in the tooling plate open channel and the actuation member is rotated, neither the central body top surface nor the top surface of the wedge(s) extends beyond the tooling plate top surface when the mounting member is secured in the tooling plate open channel, thereby allowing for substantially flush contact between the top surface of the tooling plate and the mounting surface of the tooling secured thereto.

In another aspect, the present invention is directed to a T-Nut for use in a machine tool having a tooling plate with a top surface and an inverted T-shaped channel having a lower wide portion and an upper narrow portion. The T-Nut comprises a central body having oppositely inclined faces, each face including an opening forming a cavity extending through the central body, the central body adapted to slidingly fit in the tooling plate T-shaped channel and mate with a mounting surface of tooling to be secured to the tooling plate. The T-Nut further comprises first and second wedges in slideable communication with the central body inclined faces and having mating surfaces inclined at substantially the same angle as the central body inclined faces and wings extending laterally beyond the central body to engage upper surfaces of the channel lower wide portion. Each of the wedges includes a clearance hole extending through a length of the wedge, the second wedge further including a cross-drilled through hole extending through its width. An actuation member abuts the first wedge at an end opposite the first wedge mating surface and is internally threaded for a distance from one end thereof and has an opening with a hexagonal engagement on the other end, the hexagonal engagement adapted for receiving an actuating force in a rotational direction about a longitudinal axis of the actuation member. An externally threaded shaft is engaged with the internal threads of the actuation member and extends through the first and second wedge clearance holes, the shaft having a cross-drilled hole on one end having substantially the same diameter as the second wedge through-hole and the shaft being secured to and non-rotatable with the second wedge. A resilient fastener extends through the second wedge through-hole and through the shaft cross-drilled hole to secure the second wedge to the shaft. When tooling is secured to a top surface of the central body and an actuating force is applied to the actuation member hexagonal engagement, the first and second wedges are slideably moved symmetrically along the central body inclined faces until the first and second wedge wings engage upper surfaces of the channel lower wide portion and the tooling is urged in the direction of the tooling plate until the tooling mounting surface bears against the tooling plate top surface, thereby removably securing the tooling to the tooling plate.

The central body may include a threaded stud attached to or integral with the central body top surface and capable of mating with an internally threaded opening in a mounting surface of tooling to be secured to the tooling plate. The tooling to be secured to the tooling plate may be a Fast Tool Servo (FTS) having an internally threaded opening on a bottom mounting face, wherein the central body threaded stud is engaged with the FTS internally threaded opening to secure the FTS to the T-Nut.

The threaded shaft may have a tapering diameter in the direction of its center and the central body may have a bottom surface including at least one opening having a predetermined depth. When the central body is slidingly fit in the tooling plate T-shaped channel and the actuation member is rotated, neither the central body top surface nor the first and second wedge top surfaces extends beyond the tooling plate top surface when the T-Nut is secured in the tooling plate T-shaped channel, thereby allowing for substantially flush contact between the top surface of the tooling plate and the mounting surface of the tooling secured thereto.

In yet another aspect, the present invention is directed to a method for removably securing tooling to a holding surface of a tooling plate having an open channel with at least one perpendicular extension below the tooling plate holding surface. The method comprises providing a mounting member as described above, removeably securing the mounting surface of tooling to the mounting member central body top surface, slideably inserting the mounting member into the tooling plate open channel to a desired position, and rotating the actuation member such that the mounting member first wedge is slideably moved along the central body inclined surface until the first wedge at least one wing engages an upper surface of the channel at least one perpendicular extension and the tooling is urged in the direction of the tooling plate until the tooling mounting surface bears against the tooling plate top surface.

The method may further include the steps of rotating the actuation member in an opposite direction such that the first wedge is slideably moved along the central body inclined surface until the first wedge at least one wing no longer engages the upper surface of the channel at least one perpendicular extension, and removing the mounting member from the tooling plate open channel.

In still yet another aspect, the present invention is directed to a method of assembling a T-Nut for use in a machine tool having a tooling plate with a top surface and an inverted T-shaped channel having a lower wide portion and an upper narrow portion. The method comprises providing a central body having oppositely inclined faces, each face including an opening forming a cavity extending through the central body, the central body adapted to slidingly fit in the tooling plate T-shaped channel and mate with a mounting surface of tooling to be secured to the tooling plate; providing first and second wedges capable of slideable communication with the central body inclined faces and having mating surfaces inclined at substantially the same angle as the central body inclined faces and wings extending laterally beyond the central body to engage upper surfaces of the channel lower wide portion, each of the wedges including a clearance hole extending through a length of the wedge, the second wedge further including a cross-drilled through hole extending through its width; providing an actuation member internally threaded for a distance from one end thereof, the actuation member adapted for receiving an actuating force in a rotational direction about a longitudinal axis of the actuation member; and providing an externally threaded shaft having a tapering diameter in the direction of its center and a cross-drilled hole on one end having substantially the same diameter as the second wedge through-hole. The method further comprises slideably inserting the threaded shaft through the second wedge clearance hole while aligning the second wedge and threaded shaft cross-drilled through holes; inserting a resilient fastener through the second wedge through-hole and through the shaft cross-drilled hole to non-rotatably secure the second wedge to the threaded shaft; sliding the central body over an end of the threaded shaft by inserting the threaded shaft through the central body cavity until one of the central body inclined faces contacts the second wedge mating surface; sliding the first wedge over the end of the threaded shaft by inserting the threaded shaft through the first wedge clearance hole until the first wedge mating surface contacts the opposing central body inclined face; and threading the actuation member internally threaded end onto the end of the threaded shaft.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

Figure 1:
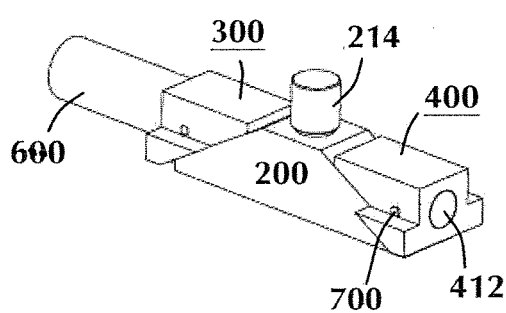
FIG. 1 is a perspective view of one embodiment of the T-Nut of the present invention.

In describing the embodiments of the present invention, reference will be made herein to FIGS. 1-6 of the drawings in which like numerals refer to like features of the invention.

Certain terminology is used herein for convenience only and is not to be taken as a limitation of the invention. For example, words such as "upper," "lower," "left," "right," "horizontal," "vertical," "upward," and "downward" merely describe the configuration shown in the drawings. For purposes of clarity, the same reference numbers may be used in the drawings to identify similar elements.

Additionally, in the subject description, the word "exemplary" is used to mean serving as an example, instance or illustration. Any aspect or design described herein as "exemplary" is not necessarily intended to be construed as preferred or advantageous over other aspects or design. Rather, the use of the word "exemplary" is merely intended to present concepts in a concrete fashion.

An embodiment of the T-Nut or mounting member of the present invention is shown in its entirety at FIGS. 1-5B, and the various embodiments are described in detail below. For convenience in describing the features and functioning of the present invention, reference is first made to FIG. 6, which shows an exemplary machine tool and tooling plate of known character with an embodiment of the T-Nut of the present invention slideably inserted and removably secured therein, the method of which will be described in more detail below. The machine tool includes a tooling plate or table 1000 for mounting tooling thereon, such as a Fast Tool Servo (FTS). A typical tooling plate or table has one or more T-Slots or inverted T-shaped channels 1006, which open out through the end 1004 of the tooling plate and open up through the top surface 1002. For clarity, FIG. 6 depicts a tooling plate with a single T-Slot 1006. The end of the tooling plate typically includes a terminal portion with an opening (not shown) enabling insertion of one or more bolts in the T-Slot 1006 to engage an otherwise conventional T-Nut. In a conventional assembly, the bolts must first pass through the object or tooling before engaging the T-Nut.

The T-Nut of the present invention remedies a deficiency of the prior art by eliminating bolting of the object or tooling to the tooling plate, thereby affording the ability to secure tooling having internal components, which would otherwise be prohibited. The T-Nut may be used in various kinds of machines, such as a Bridgeport milling machine, Bring bar tables, Horizontal milling machine tables, and the like, and in all cases, the T-Slots are similar and arranged in a similar manner, opening out through the ends of the tooling plate and up through the top surface thereof. The different elements or portions of the T-Slots in the various machines may be of various dimensions, and the T-Nuts are dimensioned correspondingly thereto. Each T-Slot 1006 includes an upper narrow portion 1012 and a lower wide portion comprising perpendicular extensions 1008, 1010 (not shown) below the tooling plate top surface. By way of example, the width of the lower portion 1008, 1010 as shown in the present exemplary embodiment may be 0.780 inches, while the width of the narrow upper portion 1012 may be 0.500 inches; however it should be understood by those skilled in the art that the present invention is not limited to such dimensions and may be correspondingly dimensioned to the dimensions of the tooling plate T-Slot into which the T-Nut is to be slideably inserted to a desired position and removably secured.

Figure 2:
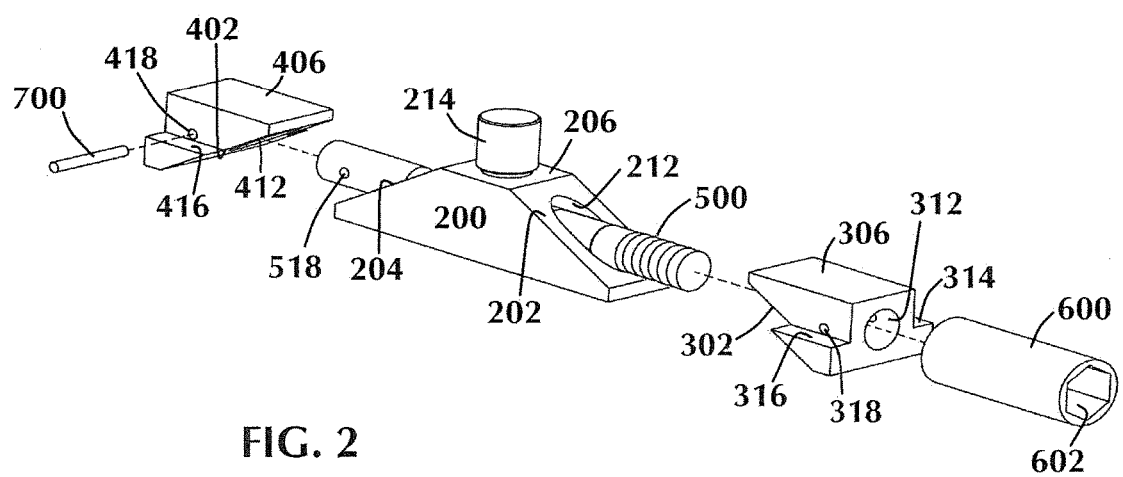
FIG. 2 is an exploded perspective view of the T-Nut of FIG. 1.
Figure 3:
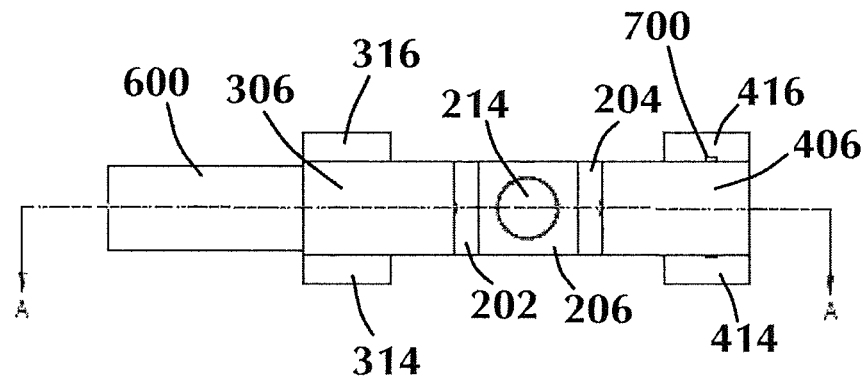
FIG. 3 is a top plan view of the T-Nut of FIG. 1.
Figure 4A:
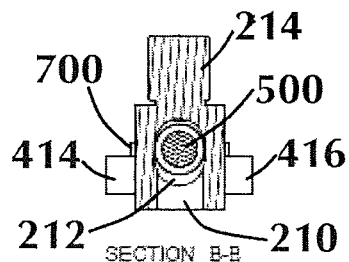
FIG. 4A is a cross-sectional view of the T-Nut of FIG. 4, taken along section B-B
Figure 4:
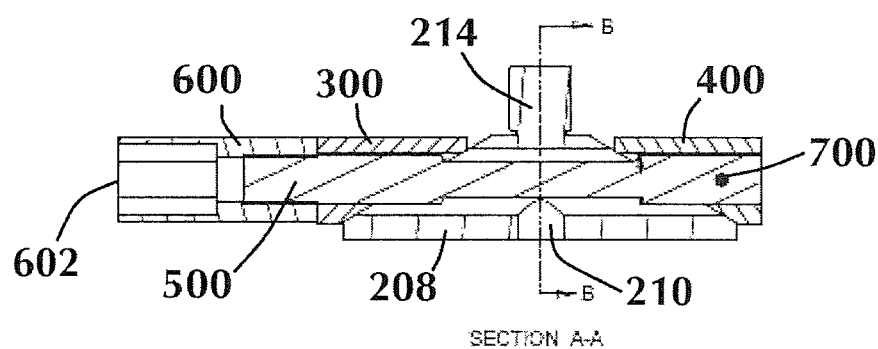
FIG. 4 is a cross-sectional view of the T-Nut of FIG. 3, taken along section A-A.

Referring now collectively to FIGS. 1-5B, an exemplary embodiment of the T-Nut or mounting member of the present invention is shown. As shown in FIG. 2, the mounting member has a central body 200 having at least one inclined face 202, 204 and a cavity 212 extending therethrough. The central body may be made of a material such as hardened steel, or any other material rigid enough to maintain its shape during use. The central body is adapted to slidingly fit in the open channel 1006 of a machine tooling plate and mate with a mounting surface of tooling to be secured to the tooling plate. The central body top surface 206 may be adapted to mate with a mounting surface of tooling using any known method in the art, such as a keyseat/keyway or spline, a cantilever mount, and the like. As shown in FIGS. 1 and 2, in one or more embodiments, the central body 200 may include a threaded stud 214 attached to or integral with the top surface 206 for mating with an internally threaded opening in the mounting surface of tooling, such as a Fast Tool Servo (FTS). The stud may be any size typically used in the machine tool industry, such as an M10 threaded stud, and may be threaded into a correspondingly sized M10 threaded opening in the FTS mounting surface. As shown in FIGS. 4 and 4A, the central body bottom surface 208 may further include a drilled hole or opening 210 that aids in the manufacture of the central body 200.

In an embodiment, the mounting member includes at least one wedge in slideable communication with the at least one central body inclined face, and the wedge includes one or more wings extending laterally beyond the central body 200 for engaging a surface of the channel or slot in the tooling plate. The wedge may also be made of a material such as hardened steel, or any other material rigid enough to maintain its shape during use. Prior to assembly, the central body inclined face and the wedge mating surface may each be lubricated, such as with Kluber Lubrication® Isoflex Topas NB 82, to aid in actuation. As shown in FIGS. 1-2, in one or more embodiments, the mounting member central body 200 includes a second oppositely inclined face 204 at a second end and the mounting member further includes a second wedge 400 in slideable communication with the central body second inclined face 204. Each wedge has a top surface 306, 406 and a mating surface 302, 402 at one end inclined at substantially the same angle as the adjacent central body inclined face 202, 204. Each wedge further includes a clearance hole 312, 412 extending through the length of the wedge and at least one wing 314, 316, 414, 416 extending laterally beyond the central body 200.

Figure 1A:
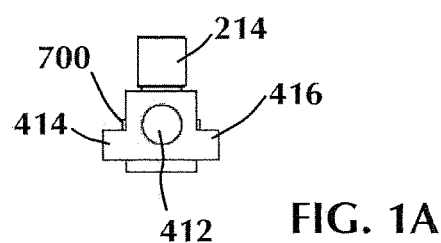
FIG. 1A is a right-sided end view of the T-Nut of FIG. 1.

FIG. 1A depicts a right-sided end view of the embodiment of the present invention shown in FIG. 1. As shown in FIG. 1A, when the wedge(s) include a pair of wings 414, 416 positioned on opposite sides of the wedge 400, the wedge has an inverted T-shaped profile substantially corresponding to the dimensions of a conventional T-Slot in a machine tooling table. Wedge 300 (not shown) has an identical T-shaped profile. In other embodiments, the at least one wedge may include only one wing, giving the mounting member an "L" shaped profile for engaging an "L" shaped channel in a tooling plate, wherein the channel includes a narrow upper portion opening up through the top surface and a perpendicular extension below the tooling plate top surface. As shown in FIG. 1A, the wings 414, 416 may be substantially planar for bearing against a planar upper surface of the lower wide portion of a conventional tooling plate T-Slot; however it should be understood by those skilled in the art that the present invention is not limited to a T- or L-shaped profile, and that the profile of the mounting member may be any shape corresponding to the dimensions of the slot in the tooling plate, so long as the at least one wedge is capable of being actuated such that the wedge wing(s) engage an upper surface of the slot, as will be described below.

An externally threaded cylindrical shaft 500 extends through the wedge clearance hole 312 and through the central body cavity 212, and may be secured to and non-rotatable with the central body 200. One end of the threaded shaft protrudes beyond the end of the wedge and is threadably engaged with an actuation member 600 which abuts the end of the wedge opposite the inclined mating surface (FIG. 4). As best shown in FIG. 2, in an embodiment of the present invention including two wedges in slideable communication with the central body, the threaded shaft 500 extends through the first wedge clearance hole 312 through the central body cavity 212 and through second wedge clearance hole 412 and is secured to and non-rotatable with the second wedge 400. In at least one embodiment, as shown in FIG. 4, the threaded shaft 500 may have a tapering diameter in the direction of its center. The tapering diameter provides clearance between threaded shaft 500 and the central body 200 as the threaded shaft 500 moves vertically in the central body 200 during actuation of the wedge(s). Referring again to FIG. 2, in one or more embodiments, each of the second wedge 400 and the threaded shaft 500 may include a cross-drilled through hole 418, 518 of substantially the same diameter, such as a diameter of 0.0625 inches, wherein the through holes are aligned when the shaft 500 extends through the second wedge clearance hole 412. A resilient fastener, such as a spring pin 700, may be inserted therethrough to non-rotatably secure the shaft to the second wedge. Once inserted, the ends of spring pin 700 may be substantially flush with the outer surfaces of the second wedge 400, as shown in FIG. 1A.

The T-Nut or mounting member of the present invention further includes a rotatable actuation member 600 internally threaded for a distance from one end thereof and threadably engaged with an end of the externally threaded shaft 500. In an embodiment, the actuation member 600 abuts the first wedge 300 at an end opposite the wedge inclined mating surface 302 (FIGS. 2 and 4). Actuation member 600 is capable of being rotated about its longitudinal axis to apply an actuating force. As shown in FIG. 2, actuation member 600 may include an opening 602 on an opposite end with a hexagonal engagement adapted for receiving a fastening device, such as a hex wrench, for rotating the actuation member in a clockwise direction. The method of rotating the actuation member is not limited to an internal engagement such as with a hex wrench, and may be any known method in the art, such as engaging the outer surface of the actuation member with a socket wrench or ratchet. In various other embodiments, the outer surface of the actuation member 600 may comprise a plurality of ribs for engaging a device capable of rotating the actuation member. As will be described in more detail below, rotating the actuation member 600 actuates the wedge(s) such that the wedge(s) symmetrically move along the central body inclined faces in the direction of the central body top surface 206 (FIGS. 5A-5B).

A method of assembling the T-Nut of the present invention may comprise the following steps. The threaded shaft is slideably inserted through the clearance hole in one of the wedges while aligning the wedge and threaded shaft cross-drilled through holes. A spring pin (or other fastener) is then inserted through the aligned cross-drilled through holes until the pin is flush with the outer surface of the wedge, to secure the wedge to the threaded shaft. The central body is then slid over an end of the threaded shaft by inserting the threaded shaft through the central body cavity until one of the central body inclined faces contacts the adjacent wedge mating surface and the opposite end of the threaded shaft protrudes beyond the central body cavity. A second wedge is then slid over the protruding end of the threaded shaft by inserting the threaded shaft through the wedge clearance hole until the second wedge mating surface contacts the adjacent central body inclined face and the end of the thread shaft protrudes beyond the wedge clearance hole. The actuation member is then threaded onto the end of the threaded shaft to complete the assembly. FIG. 4 depicts a cross-sectional view of the assembled T-Nut, as described above and shown in FIGS. 1-3.

Figure 5A:
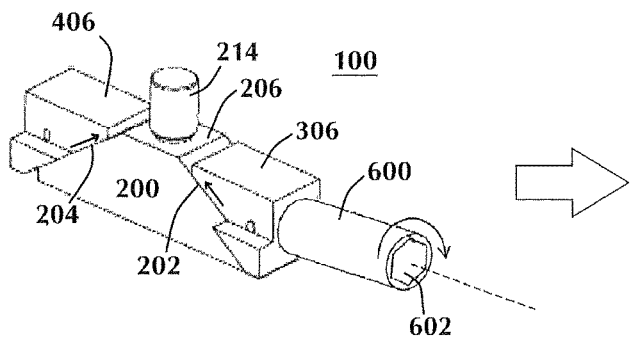
FIG. 5A-5B are perspective views of an embodiment of the T-Nut of the present invention showing a method of operation.
Figure 5B:
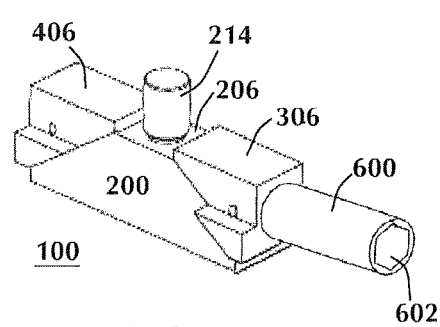
Figure 6:
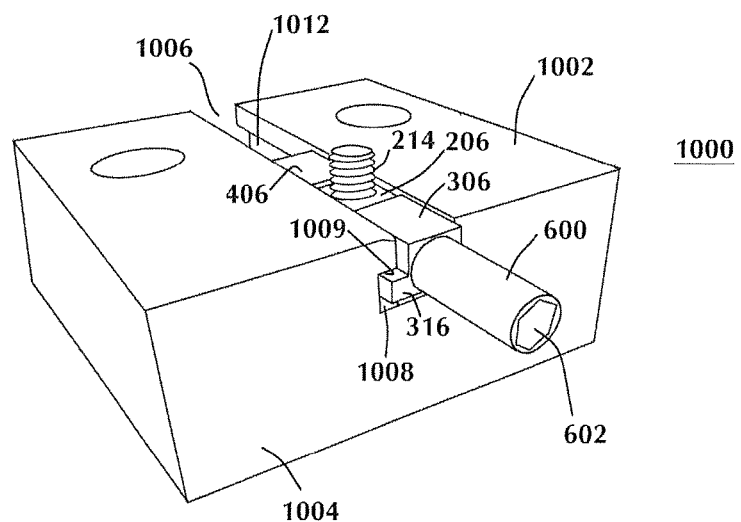
FIG. 6 is a perspective view of an embodiment of the T-Nut of the present invention secured in a T-Slot of a machine tooling plate.

FIGS. 5A and 5B depict a method for actuating the wedges of an embodiment of the T-Nut of the present invention. T-Nut 100 includes a pair of wedges 300, 400 in slideable communication with the central body inclined faces 202, 204. As shown in FIG. 5A, one end of actuation member 600 includes an opening with a hexagonal engagement 602 adapted for receiving an actuating force in a clockwise direction about its longitudinal axis. As actuation member 600 is rotated clockwise, wedges 300, 400 are actuated and slideably moved symmetrically along the central body inclined surfaces 202, 204 in the direction of the central body top surface 206 (FIG. 5B). Actuation member 600 may be rotated in the opposite direction to return wedges 300, 400 to their initial positions. In various embodiments, the initial rotation direction may also be reversed, e.g. the actuation force may be applied in a counterclockwise direction to slideably move wedges 300, 400 in the direction of the central body top surface 206.

The T-Nut as described above may be used to attach an FTS (or any similar device) to a machine tooling plate. The FTS may include an M10 tapped hole on the bottom mounting surface, i.e. the surface that will sit on the tooling plate. To secure the FTS to the T-Nut, the M10 tapped hole may be threaded onto an M10 threaded stud attached to or integral with the T-Nut central body top surface. It should be understood that other methods of engagement known to those skilled in the art are not precluded, and that the method described is only one such example. As shown in FIG. 6, when the mounting member (for clarity, the attached FTS is not shown) is slidingly fit in the machine tooling plate open channel 1006 to its required position and the actuation member 600 is rotated, the actuation force causes wedges 300, 400 (not shown) to be drawn together and slideably move along the central body inclined surface in the direction of the top surface 1002 of the tooling plate (as shown in FIGS. 5A-5B) until the wedge wing(s) 314, 316 bear against the upper surface 1009 of the channel lower wide portion 1008, 1010. Simultaneously, the mounting surface of the tooling, which has been secured to the T-Nut central body top surface 206, is urged in the direction of the tooling plate until the tooling mounting surface bears against the tooling plate top surface 1002, thereby removably securing the tooling to the tooling plate. The securing force is derived from the torque applied to the actuation member 600. In a secured position, as shown in FIG. 6, the wedge top surfaces 306, 406 are below the top surface 1002 of the tooling plate, so as to allow substantially flush contact between the top surface 1002 and the mounting surface of the tooling. To remove or reposition the tooling, the actuation member 600 may be rotated in the opposite direction until the wedge wings no longer bear against the upper surface of the channel lower wide portion. The mounting member of the present invention remedies a deficiency of the conventional T-Nut of the prior art by eliminating the need for bolting of the tooling to the tooling plate or the need for a mounting foot, and allows for simple securing, re-positioning or removal of the tooling by rotation of the actuation member to actuate the wedges and engage the wedge wing(s) with the upper surface of the tooling plate open channel.

Thus, the present invention achieves one or more of the following advantages. The present invention provides an improved T-Nut or mounting member for use in a machine tool having a tooling plate with an open channel with at least one perpendicular extension below the tooling plate top surface. The mounting member eliminates the need for bolting of the tooling to the tooling plate, thereby allowing for tooling having internal components to more easily be secured to or removed from the tooling plate, which would otherwise be prohibited using a conventional T-Nut. Further, the present invention does not require a mounting foot with a flange to be made for such devices and therefore does not increase the footprint on which the tooling sits, allowing for other metrology or devices to also be held to the tooling plate. The present invention further provides an improved method of securing tooling to a tooling plate that does not interfere with the internal components of the tooling and does not increase the footprint on which the tooling sits.

While the present invention has been particularly described, in conjunction with specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A mounting member for use in a machine tool having a tooling plate with a top surface and an open channel with at least one perpendicular extension below the tooling plate top surface, the mounting member comprising:

a central body having at least one inclined face at a first end and an opening forming a cavity extending through the central body, the central body adapted to slidingly fit in the tooling plate open channel and mate with a mounting surface of tooling to be secured to the tooling plate;

a first wedge in slideable communication with the central body inclined face and having a top surface and a mating surface at one end inclined at substantially the same angle as the central body inclined face, the first wedge including a clearance hole extending through a length of the wedge and at least one wing extending laterally beyond the central body to engage an upper surface of the tooling plate open channel at least one perpendicular extension;

an actuation member internally threaded for a distance from one end thereof, the actuation member abutting the first wedge at an end opposite the first wedge mating surface; and an externally threaded shaft engaged with the internal threads of the actuation member and extending through the first wedge clearance hole and through the central body cavity, the shaft being secured to and non-rotatable with the central body, whereby when the tooling is secured to a top surface of the central body and the actuation member is rotated, the first wedge is slideably moved along the central body inclined face until the first wedge at least one wing engages an upper surface of the open channel at least one perpendicular extension and the work piece is urged in the direction of the tooling plate until the tooling mounting surface bears against the tooling plate top surface, thereby removably securing the tooling to the tooling plate.

2. The mounting member of claim 1 wherein the tooling plate open channel comprises an inverted T-shaped channel having a lower wide portion and an upper narrow portion, and the first wedge further comprises a second wing opposite the first wing and extending laterally beyond the central body, the first and second wings positioned to engage upper surfaces of the channel lower wide portion.

3. The mounting member of claim 1 wherein the central body further comprises a second oppositely inclined face at a second end, and the mounting member further comprises a second wedge in slideable communication with the central body second inclined face having a top surface and a mating surface at one end inclined at substantially the same angle as the central body second inclined face and at least one wing extending laterally beyond the central body to engage an upper surface of the tooling plate open channel at least one perpendicular extension, the second wedge including a clearance hole extending through a length of the wedge wherein the shaft extends through the second wedge clearance hole, the shaft being secured to and non-rotatable with the second wedge, whereby when the tooling is secured to the central body top surface and the actuation member is rotated, the first and second wedges are slideably moved symmetrically along the central body inclined surfaces until the first and second wedge at least one wing engages an upper surface of the open channel at least one perpendicular extension and the tooling is urged in the direction of the tooling plate until the tooling mounting surface bears against the tooling plate top surface, thereby removably securing the tooling to the tooling plate.

4. The mounting member of claim 3 wherein the tooling plate open channel comprises an inverted T-shaped channel having a lower wide portion and an upper narrow portion, and the first and second wedges further comprise a second wing opposite the first wing and extending laterally beyond the central body, the first and second wings positioned to engage upper surfaces of the channel lower wide portion when the actuation member is rotated.

5. The mounting member of claim 3 wherein the second wedge and the shaft each include a cross-drilled through hole having substantially the same diameter, and wherein the through holes are aligned when the shaft extends through the second wedge clearance hole, the shaft secured to the second wedge using a resilient fastener extending through the aligned through holes.

6. The mounting member of claim 1 wherein the actuation member includes an opening with a hexagonal engagement on the opposite end, the hexagonal engagement adapted for receiving an actuating force applied in a rotational direction about a longitudinal axis of the actuation member.

7. The mounting member of claim 1 wherein the central body includes a threaded stud attached to or integral with the central body top surface, the threaded stud capable of mating with an internally threaded opening in a mounting surface of tooling to be secured to the tooling plate.

8. The mounting member of claim 7 wherein the tooling to be secured to the tooling plate is a Fast Tool Servo (FTS) having an internally threaded opening on a bottom mounting face and wherein the central body threaded stud is engaged with the FTS internally threaded opening to secure the FTS to the mounting member.

9. The mounting member of claim 1 wherein the central body has a bottom surface including at least one opening having a predetermined depth.

10. The mounting member of claim 1 wherein when the central body is slidingly fit in the tooling plate open channel and the actuation member is rotated, neither the central body top surface nor the first wedge top surface extends beyond the tooling plate top surface when the mounting member is secured in the tooling plate open channel.

11. The mounting member of claim 3 wherein when the central body is slidingly fit in the tooling plate T-shaped channel and the actuation member is rotated, neither the central body top surface nor the first and second wedge top surfaces extend beyond the tooling plate top surface when the mounting member is secured in the tooling plate T-shaped channel.

12. A T-Nut for use in a machine tool having a tooling plate with a top surface and an inverted T-shaped channel having a lower wide portion and an upper narrow portion, the T-Nut comprising:

a central body having oppositely inclined faces, each face including an opening forming a cavity extending through the central body, the central body adapted to slidingly fit in the tooling plate T-shaped channel and mate with a mounting surface of tooling to be secured to the tooling plate;

first and second wedges in slideable communication with the central body inclined faces and having mating surfaces inclined at substantially the same angle as the central body inclined faces and wings extending laterally beyond the central body to engage upper surfaces of the channel lower wide portion, each of the wedges including a clearance hole extending through a length of the wedge, the second wedge further including a cross-drilled through hole extending through its width;

an actuation member abutting the first wedge at an end opposite the first wedge mating surface and internally threaded for a distance from one end thereof and having an opening with a hexagonal engagement on the other end, the hexagonal engagement adapted for receiving an actuating force in a rotational direction about a longitudinal axis of the actuation member;

an externally threaded shaft engaged with the internal threads of the actuation member and extending through the first and second wedge clearance holes, the shaft having a cross-drilled hole on one end having substantially the same diameter as the second wedge through-hole, the shaft being secured to and non-rotatable with the second wedge; and a resilient fastener extending through the second wedge through-hole and through the shaft cross-drilled hole to secure the second wedge to the shaft, whereby when the tooling is secured to a top surface of the central body and an actuating force is applied to the actuation member hexagonal engagement, the first and second wedges are slideably moved symmetrically along the central body inclined faces until the first and second wedge wings engage upper surfaces of the channel lower wide portion and the tooling is urged in the direction of the tooling plate until the tooling mounting surface bears against the tooling plate top surface, thereby removably securing the tooling to the tooling plate.

13. The T-Nut of claim 12 wherein the central body includes a threaded stud attached to or integral with the central body top surface, the threaded stud capable of mating with an internally threaded opening in amounting surface of tooling to be secured to the tooling plate.

14. The T-Nut of claim 13 wherein the tooling to be secured to the tooling plate is a Fast Tool Servo (FTS) having an internally threaded opening on a bottom mounting face and wherein the central body threaded stud is engaged with the FTS internally threaded opening to secure the FTS to the T-Nut.

15. The T-Nut of claim 12 wherein the shaft has a tapering diameter in the direction of its center.

16. The T-Nut of claim 12 wherein the central body has a bottom surface including at least one opening having a predetermined depth.

17. The T-Nut of claim 12 wherein when the central body is slidingly fit in the tooling plate T-shaped channel and the actuation member is rotated, neither the central body top surface nor the first and second wedge top surfaces extend beyond the tooling plate top surface when the T-Nut is secured in the tooling plate T-shaped channel.

18. A method for removably securing tooling to a holding surface of a tooling plate having an open channel with at least one perpendicular extension below the tooling plate holding surface, comprising:
    providing the mounting member of claim 1;
    securing the mounting surface of the tooling to the mounting member central body top surface;
    slideably inserting the mounting member into the tooling plate open channel to a desired position; and
    rotating the actuation member such that the mounting member first wedge is slideably moved along the central body inclined surface until the first wedge at least one wing engages an upper surface of the channel at least one perpendicular extension and the tooling is urged in the direction of the tooling plate until the tooling mounting surface bears against the tooling plate top surface.

19. The method of claim 18 further including the steps of:
    rotating the actuation member in an opposite direction such that the first wedge is slideably moved along the central body inclined surface until the first wedge at least one wing no longer engages the upper surface of the channel at least one perpendicular extension; and
    removing the mounting member from the tooling plate open channel.

20. A method of assembling a T-Nut for use in a machine tool having a tooling plate with a top surface and an inverted T-shaped channel having a lower wide portion and an upper narrow portion, comprising:
    providing a central body having oppositely inclined faces, each face including an opening forming a cavity extending through the central body, the central body adapted to slidingly fit in the tooling plate T-shaped channel and mate with a mounting surface of tooling to be secured to the tooling plate;
    providing first and second wedges capable of slideable communication with the central body inclined faces and having mating surfaces inclined at substantially the same angle as the central body inclined faces and wings extending laterally beyond the central body to engage upper surfaces of the channel lower wide portion, each of the wedges including a clearance hole extending through a length of the wedge, the second wedge further including a cross-drilled through hole extending through its width;
    providing an actuation member internally threaded for a distance from one end thereof, the actuation member adapted for receiving an actuating force in a rotational direction about a longitudinal axis of the actuation member;
    providing an externally threaded shaft having a tapering diameter in the direction of its center and a cross-drilled hole on one end having substantially the same diameter as the second wedge through-hole;
    slideably inserting the threaded shaft through the second wedge clearance hole while aligning the second wedge and threaded shaft cross-drilled through holes;
    inserting a resilient fastener through the second wedge through-hole and through the shaft cross-drilled hole to non-rotatably secure the second wedge to the threaded shaft;
    sliding the central body over an end of the threaded shaft by inserting the threaded shaft through the central body cavity until one of the central body inclined faces contacts the second wedge mating surface;
    sliding the first wedge over the end of the threaded shaft by inserting the threaded shaft through the first wedge clearance hole until the first wedge mating surface contacts the opposing central body inclined face; and
    threading the actuation member internally threaded end onto the end of the threaded shaft.

\* \* \* \* \*